Nov. 20, 1923.  1,474,591
L. H. HOUNSFIELD
CONNECTING ROD AND THE COOPERATING PARTS OF ENGINES, PUMPS, AND THE LIKE
Filed Jan. 6, 1923

INVENTOR.
Leslie Haywood Hounsfield
by Byrnes, Stebbins & Parmelee
Attys

Patented Nov. 20, 1923.

1,474,591

UNITED STATES PATENT OFFICE.

LESLIE HAYWOOD HOUNSFIELD, OF CROYDON, ENGLAND.

CONNECTING ROD AND THE COOPERATING PARTS OF ENGINES, PUMPS, AND THE LIKE.

Application filed January 6, 1923. Serial No. 611,035.

*To all whom it may concern:*

Be it known that I, LESLIE HAYWOOD HOUNSFIELD, a subject of the King of England, residing at Croydon, Surrey, England, have invented certain new and useful Improvements in the Connecting Rods and the Cooperating Parts of Engines, Pumps, and the like, of which the following is a specification.

This invention is for improvements in or relating to the connecting rods and the cooperating parts of engines, pumps and the like. The invention is particularly concerned with the rods coupling the pistons, plungers or other reciprocating portions to the rotating crank pin or pins of a two or more cylinder engine, pump or the like, and with that class of apparatus in which pistons, moving in approximately parallel cylinders, operate in pairs upon a crank pin the axis of the crank shaft not being in, or parallel to, the plane through the axes of the cylinders but say at right angles thereto.

The invention has for one of its objects the production of connecting rods which shall be cheaper to manufacture and more effective in operation than those hitherto proposed. Another object of the invention is to obviate the necessity for using offset connecting rods as rods which can be loaded symmetrically about their median plane are to be preferred.

One feature of the invention consists in the provision of reciprocating engines, pumps and the like, comprising a pair of pistons or other reciprocating parts connected to a single crank pin or the equivalent and moving in similar paths but at relatively varying velocities, which are characterized by the use of a connecting rod for the pair of pistons which rod is constructed without a pivotal joint in its internal structure so that variations in the distance between the pistons have to be accommodated by the elastic flexure of the rod.

Another feature of the invention consists in the provision of a connecting rod for use as above which is characterized in that it is in the form of a fork with flexible, but not hinged, arms, and has means at the base of the fork for attaching it to a crank pin and means at the extremity of each fork arm for attaching it to a piston.

A further feature of the invention consists in the use of the aforesaid elastic flexure of the connecting rod to transfer lateral thrust from the one piston to the other in addition to accommodating the variations in the proximity of the pistons to each other.

For a more complete understanding of the invention there will now be described, by way of example only and with reference to the accompanying drawings, certain constructional forms of connecting rod according to the present invention. It is to be understood, however, that the invention is not limited to the precise constructional details set forth.

In these drawings:—

Like reference numerals indicate like parts throughout the drawings.

Figure 1:
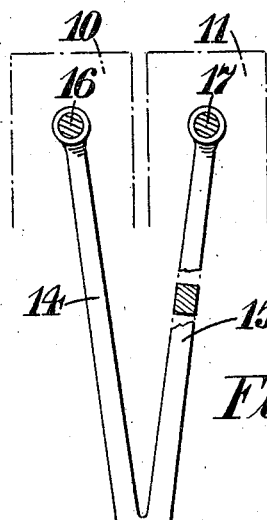
Figure 1 is a diagrammatical view of one form of connecting rod according to the invention showing the same at one extremity of its stroke.

It will be seen that in all the constructions illustrated a pair of pistons 10 and 11 are connected to a single crank pin 12 by a forked connecting rod 13. The arms 14 and 15 of the connecting rod are made so as not to be absolutely rigid but rather to be capable of elastic flexure so as to vary the angle between them. It will be appreciated that the pistons move in paths which are similar to each other but at velocities which vary. This will be clear from an inspection of Figure 2. The effect of this is to vary the distance between the gudgeon pins 16 and 17. These will be closest to each other when the connecting rod is at the upper or lower extremity of its stroke and will be at slightly increased distances at the other points of the stroke, and the substance of the invention consists in using rods so constructed as to enable them to accommodate themselves to this varying distance by the flexing of the material of the arms themselves. In Figure 1 there is shown a suitable section of rod for effecting this springing action. Heretofore it has been usual to provide a pivotal joint somewhere between the gudgeon pins 16 and 17 to accommodate the variation without bending the rods, but this is not so advantageous a construction as the one constituting the present invention.

Figure 2:
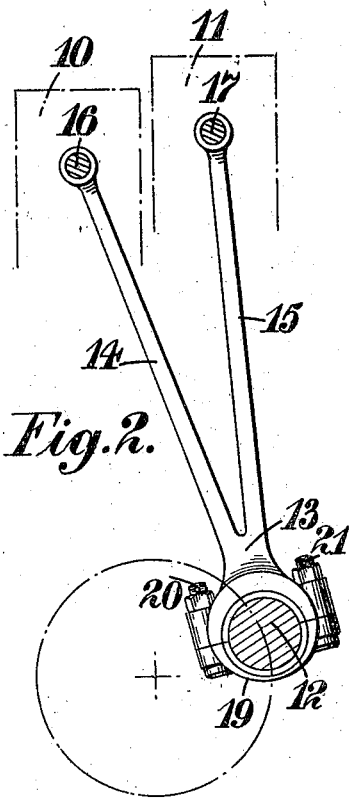
Figure 2 is a similar view of a modified construction showing the rod at an intermediate point of its stroke.
Figure 3:
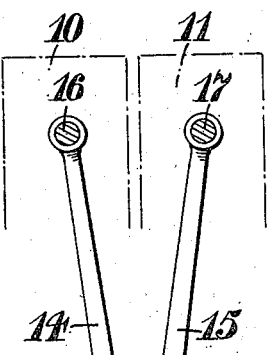
Figure 3 is a similar view of a further modification showing the parts in the same position as that shown in Figure 1.
Figure 3:
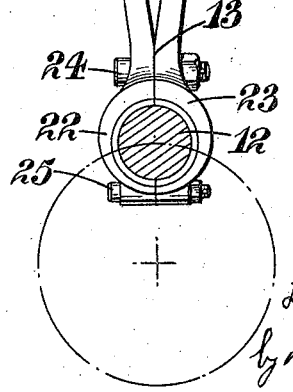

In the construction shown in Figure 1, the connecting rod is made entirely in one piece and this design is suitable for use in cases where the big end 18 can be conveniently passed over one end of the crank pin 12. Figures 2 and 3 represent examples of other types of construction necessary where the big end has to be divided for the purpose of assembling the connecting rod in position. For instance the constructions shown in Figures 2 and 3 may be employed where the crank pin is situated between crank shaft webs which are not detachable. In Figure 2 a detachable end cap 19 is employed which is kept in place by bolts 20 and 21, while in Figure 3 each arm 14 and 15 has integral with it a portion 22 and 23 respectively of the big end. The two halves of the connecting rod in this case are held together by bolts 24 and 25. It will be understood that although in the constructions shown in Figures 2 and 3 the connecting rod is built-up or jointed yet the joints are not of a pivoting or hinging nature and do not assist in accommodating variations in the distance between the gudgeon pins 16 and 17.

All of the wearing pins or bearings may be bushed with suitable material and it will be noticed that in each of the constructions shown the forked rod connects two pistons in cylinders whereof the axes lie in a plane at right angles to the axis of the crank shaft.

The bending stress imposed on the arms of the connecting rod may be beneficially utilized for a purpose other than that of accommodating variations in the distance between the pins 16 and 17. For instance, referring to Figure 2, if the pistons 10 and 11 are sustaining the load of the explosion of the working charge, then the piston 10 in the position shown has a much greater side thrust on its cylinder than the piston 11, and if in this position the bending stress on the arms 14 and 15 tends to make the pins 16 and 17 approach one another, then some of the lateral thrust of the piston 10 will be transferred to the piston 11 and thus the stresses equalized to a degree.

It will be appreciated that the invention obviates the use of two separate bearings adjacent to one another on a single crank pin and thus an unbroken bearing surface is provided which facilitates the retention of the lubricant on the loaded side of the crank pin. Moreover, if the lining bushes or the like be excluded from consideration, only one part is necessary to form the pair of rods in the construction shown in Figure 1 and only two parts in the construction shown in Figures 2 and 3.

I claim:—

1. In reciprocating engines, pumps and the like, the combination of two separately movable members mounted to reciprocate side by side, a crank shaft embodying a single crank pin appropriated to both said members, which latter vary their proximity to each other during their reciprocation, and a connecting rod in the form of a single unit extending from the crank pin to both said members, said connecting rod unit being constructed without a pivotal joint in its internal structure and accommodating, by its own elastic flexure, the said variations in the proximity of the two members to each other.

2. In reciprocating engines, pumps and the like, the combination of two separately movable members mounted to reciprocate side by side substantially parallel to each other in similar paths but at relatively varying velocities, a crank shaft embodying a single crank pin appropriated to both said members, which latter vary their proximity to each other during their movement, and a flexible connecting rod in the form of a single unit extending from the crank pin to both said members, said connecting rod unit being constructed without a pivotal joint in its internal structure and accommodating, by its own elastic flexure, the said variations in the proximity of the two members.

3. In reciprocating engines, pumps and the like, the combination of two separately reciprocating pistons whereof the paths of movement lie in a single plane, a crank shaft embodying a single crank pin appropriated to both said pistons, the axis of said crank shaft lying out of parallelism with the plane in which the pistons reciprocate and the latter varying their proximity to each other during the movement of the parts, and a connecting rod in the form of a single unit extending from the crank pin to both the pistons, said connecting rod unit being constructed without a hinging joint in its internal structure and accommodating, by its own elastic flexure, the said variations in the proximity of the pistons to each other.

4. In reciprocating engines, pumps and the like, the combination of two separately reciprocating pistons whereof the paths of movement lie in a single plane and substantially parallel to each other, a crank shaft embodying a single crank pin appropriated to both said pistons, the axis of said crank shaft lying out of parallelism with the plane in which the pistons move and the latter varying their proximity to each other during their reciprocation, and a non-rigid connecting rod in the form of a single unit extending from the crank pin to both the pistons, said connecting rod unit being constructed without a hinging joint in its internal structure and accommodating, by its own elastic flexure, the said variations in the proximity of the two pistons to each other.

5. In reciprocating engines, pumps and the like, the combination of two separately movable members mounted to reciprocate side by side, a crank shaft embodying a single crank pin appropriated to both said members, which latter vary their proximity to each other during their movement, and a connecting rod in the form of a single forked unit whereof the arms extend from the crank pin one to each reciprocating member in an approximately straight line, said connecting rod unit being constructed without a pivotal joint between its arms which are sufficiently flexible to permit the angle between them to vary to accommodate the said variations in the proximity of the said reciprocating members to each other.

6. In reciprocating engines, pumps and the like, the combination of two separately reciprocating pistons, a crank shaft embodying a single crank pin appropriated to both said pistons, which latter move in similar paths but at relatively varying velocities and thus vary their proximity to each other during their movement, and a connecting rod in the form of a built-up non-rigid forked unit whereof the arms extend from the crank pin one to each piston in an approximately straight line, said connecting rod unit being built without a hinging joint between its arms which are sufficiently flexible to accommodate the said variations in the proximity of the pistons to each other.

7. In reciprocating engines, pumps and the like, the combination of two separately movable members mounted to reciprocate side by side substantially parallel to each other, a crank shaft embodying a single crank pin appropriated to both said members, means for coupling both of the said movable members to the crank pin in such manner that they vary their proximity to each other during their reciprocation, and means for transferring from the one movable member to the other, through the said coupling means, thrust in the direction laterally of the reciprocatory movement of the said movable members.

8. In reciprocating engines, pumps and the like, the combination of two separately reciprocating pistons movable substantially parallel to each other, a crank shaft embodying a single crank pin appropriated to both said pistons, and a connecting rod for coupling both of the pistons to the crank pin in such manner that they vary their proximity to each other during their reciprocation, and, by its own elastic flexure, transferring lateral thrust from the one piston to the other and accommodating the said variations in the proximity of the pistons to each other.

9. For a reciprocating engine, pump or the like, a connecting rod in the form of a fork with flexible, but not hinged, arms, means at the base of the fork for attaching the rod to a crank pin and means at the extremity of each fork arm for attaching it to a piston.

In testimony whereof I affix my signature.

LESLIE HAYWOOD HOUNSFIELD.